(12) United States Patent
Hsiao

(10) Patent No.: US 7,201,114 B2
(45) Date of Patent: Apr. 10, 2007

(54) APPARATUS FOR GUIDING AQUATIC CRUSTACEANS BY UTILIZING THEIR BIOLOGICAL TENDENCY RESPONDING TO BRIGHT AND DARK CONTRAST

(76) Inventor: Shyh-Min Tom Hsiao, 56,269 Lane, Luo-Tsen E. Road, Chia-Yi City 600 (TW)

(*) Notice: Subject to any disclaimer, the term of this patent is extended or adjusted under 35 U.S.C. 154(b) by 221 days.

(21) Appl. No.: 10/943,173

(22) Filed: Sep. 16, 2004

(65) Prior Publication Data
US 2006/0042555 A1 Mar. 2, 2006

Related U.S. Application Data

(63) Continuation-in-part of application No. 10/929,901, filed on Aug. 30, 2004, now Pat. No. 7,000,567.

(51) Int. Cl.
*A01K 61/00* (2006.01)

(52) U.S. Cl. ........................ 119/204; 119/267

(58) Field of Classification Search ............... 119/204, 119/207, 209, 246, 247, 248, 266, 267, 253
See application file for complete search history.

(56) References Cited

U.S. PATENT DOCUMENTS

| 1,634,305 | A | * | 7/1927 | Schrimp | 119/267 |
|---|---|---|---|---|---|
| 1,860,698 | A | * | 5/1932 | Venditti | 119/267 |
| 3,179,084 | A | * | 4/1965 | Norris et al. | 119/269 |
| 3,316,882 | A | * | 5/1967 | Renwick | 119/269 |
| 3,563,204 | A | * | 2/1971 | Szilagyi | 119/267 |
| 3,609,343 | A | * | 9/1971 | Howlett | 362/562 |
| 3,749,901 | A | * | 7/1973 | Clough | 362/562 |
| 3,951,104 | A | * | 4/1976 | Neff | 119/216 |
| 4,006,711 | A | * | 2/1977 | Frank | 119/256 |
| 4,026,243 | A | * | 5/1977 | Jessop, III | 119/246 |
| 4,036,189 | A | * | 7/1977 | Neff | 119/51.04 |
| 4,081,666 | A | * | 3/1978 | Roehrick | 362/253 |
| 4,259,926 | A | * | 4/1981 | Marliave | 119/208 |
| 4,379,437 | A | * | 4/1983 | Knowles | 119/230 |
| 4,509,458 | A | * | 4/1985 | Rines et al. | 119/217 |
| 5,066,394 | A | * | 11/1991 | Harrison | 210/169 |
| 5,113,792 | A | * | 5/1992 | Jones et al. | 119/221 |
| 5,160,431 | A | * | 11/1992 | Marioni | 210/169 |
| 5,546,289 | A | * | 8/1996 | Gordon | 362/101 |
| 5,713,303 | A | * | 2/1998 | Willinsky et al. | 119/218 |
| 5,816,196 | A | * | 10/1998 | Webster et al. | 119/228 |
| 6,158,386 | A | * | 12/2000 | Limcaco | 119/245 |
| 6,305,324 | B1 | * | 10/2001 | Hallock et al. | 119/248 |
| 6,346,262 | B1 | * | 2/2002 | Levy | 424/408 |
| 6,347,908 | B1 | * | 2/2002 | Safwat | 405/81 |
| 6,357,392 | B1 | * | 3/2002 | Ido | 119/252 |
| 6,588,371 | B2 | * | 7/2003 | Hallock et al. | 119/248 |
| 2005/0072368 | A1 | * | 4/2005 | Hsiao | 119/211 |

* cited by examiner

*Primary Examiner*—Yvonne R. Abbott
(74) *Attorney, Agent, or Firm*—Kusner & Jaffe

(57) ABSTRACT

Apparatuses for directing the displacement of aquatic crustaceans are provided and are particularly used to carry out the methods for attracting the motion of aquatic crustaceans after feeding by utilizing their biological tendency responding to a bright and dark contrast. These apparatuses generate the visual effect of bright and dark contrast at a predetermined place within the water body of culture and comprise a container for carrying the water body of culture and a predetermined place inside said container expressing an effect of bright and dark contrast. Light emitters themselves or protrusions and/or painted patterns/figures and/or filtration of light filters, under the existence of illuminating light, are used for generating visual effect of the bright and dark contrast.

17 Claims, 3 Drawing Sheets

APPARATUS FOR GUIDING AQUATIC CRUSTACEANS BY UTILIZING THEIR BIOLOGICAL TENDENCY RESPONDING TO BRIGHT AND DARK CONTRAST

The present invention is a Continuation-In-Part (CIP) of U.S. application Ser. No. 10/929,901 filed Aug. 30, 2004 now U.S. Pat. No. 7,000,567, entitled "Method for Guiding Aquatic Crustaceans by Utilizing Their Biological Tendency Responding to Bright and Dark Contrast" which is incorporated herein by reference in its entirety.

BACKGROUND OF THE INVENTION

1. Field of the Invention

The present invention relates to apparatuses used to carry out methods for guiding aquatic crustaceans' locomotive orientation with their innate biological tendency responding to specific contrasts of bright and dark. These apparatuses provide such visual effect of bright and dark contrasts at a predetermined area within these crustaceans' residing water body to initiate their move toward the predetermined areas for staying or hiding.

2. Description of Related Art

Aquatic crustaceans are important economic aquatic animals. People usually obtain those animals by harvesting them from nature environment directly or by artificial cultivation. Many countries have paid great attention to focus on this artificial cultivation. Traditionally, such artificial cultivation (named aquaculture) makes use of wide expanse of land and ponds with natural water supply. Recently, several automated high-density culturing systems have been disclosed. These systems use water recirculation equipments and filtering apparatuses to curtail both the consumption of water and land resources and the damages to the natural environment, like U.S. Pat. Nos. 4,368,691, 4,446,025 and 5,961,831. High-density cultivation system can bring larger margin but draw simultaneously a crisis to increase the production loss resulting from cannibalization which counteracts the profits. This loss is derived from different feeding and moving ability in different staged crustaceans, ex. molted or immature crustaceans are usually vulnerable to adult ones within the same body of water. This is the bottleneck in the efforts to elevate the culturing density and hence further increase its profits as well.

The behavioral management technique in maintaining cultivated aquatic crustaceans, for the purposes of reducing cannibalistic activities and other, is thus an important task in above-said systems and other ways for culturing aquatic crustaceans. Several means to attract aquatic crustaceans' active moving are employed attempting to increase the harvesting efficiency. Traditional scent/taste attractants are commonly used to implement the management of these feeding, breeding and hatching behaviors. U.S. Pat. No. 5,706,759 discloses a process to investigate potential chemo-stimulants, chemo-repelling agents or chemo-attractants for shrimps, but it still lacks further practical techniques for specific behavioral management. A kind of bait fluid, such as fish oil, is used in U.S. Pat. No. 4,828,829 only for harvesting crab with expected higher efficiency. A food-luring trapper using an attractor to attract plankton or other similar shrimp food organisms is designed to allure and catch shrimps (U.S. Pat. No. 5,259,809). No other successful methods for managing the motion of aquatic crustaceans in the light of their biological responses reacting to bright and dark visual stimuli have been developed previously.

Due to the lack of proper techniques for culturing and managing aquatic crustaceans, the culture density is always maintained as a balance between cannibalization and growth, and, in shrimp, the culture pond or tank is always kept in certain water depth, at about 0.6 to 2.0 meter, in order to reduce the incidence of cannibalizing behavior basing on the behavior that newly molted shrimp jump back or up away in order to escape from the attack of other non-molted shrimp mates. The water body with 0.6 to 2.0 meter depth has too large a mass to enable the development of multi-layered culture system and thus the traditional culturing system is restricted to planar installation.

In other fields, laboratories, with crustaceans cultivated in controlled environments for research, and markets like restaurants and pet stores, with crustaceans kept in tight space for display, all face the same problems in behavioral management of aquatic crustaceans and are unable to maintain or display living crustaceans effectively in desired manners.

In nature, many aquatic crustaceans, such as shrimps, inhabit in water environments with bright-dark alternating or contrasting light effects appearing as wavy light reflections in shelters and crevices but not in open fields. Crustaceans may use these light effects to aim for a potential hiding place. Once arriving to the location, they may use their other senses, such as tactile senses, to decide if they would take the action of hiding or go for another potential location.

Propensity to react to the bright and dark visual stimuli in aquatic crustaceans is a unique nature which can be used in a feasible means to guide their motion and localization. The present invention for guiding aquatic crustaceans is centered upon the aforesaid biological tendency. This tendency responding to bright and dark contrast, however, is not unique for just crustaceans as it can be found in other animals, like insects. No practical concepts in the prior art, however, are disclosed as an efficient and effective process for guiding aquatic crustaceans' motion related to the techniques used in the present invention.

SUMMARY OF THE INVENTION

Specific dark and bright contrasts generated by artificial dynamic or static light-emitting sources directly or through reflection and filtration are used to attract aquatic crustaceans' active moving close to predetermined places.

Under that condition, dynamic and static lighting effects visible to aquatic crustaceans are used to define where the predetermined places are located. Overall consideration for designing such places has two steps. The first is for each of these places to attract the crustaceans to move close at time when they are looking for hiding locations. The second is for the attracted animals to initiate actual hiding, eating and other specific behavior at these predetermined places. The present invention only concerns the first step, especially the first step that can be activated by artificial lighting effects. The second step that involves the presence of a proper tactile structure and other conditions further established at the predetermined places is not included in this invention.

Accordingly, it is a goal of the present invention to provide apparatuses used to guide the motion and localization of aquatic crustaceans and particularly to be utilized in the methods for attracting aquatic crustaceans to move close to a predetermined place for hiding or staying after these crustaceans are fed full but prior to the status that these crustaceans are hungry again. These methods comprise the step of generating the effect of bright and dark contrast at the predetermined place within the body of water and are described in the aforementioned co-pending application, which is incorporated herein for reference.

In summary, the apparatuses for attracting aquatic crustaceans to move close for hiding or staying offered in the present invention comprises a container for carrying the water body of culture and a predetermined place inside said container expressing an effect of bright and dark contrast. The predetermined place mentioned above is the place within the water body for culturing aquatic crustaceans that presents the visual effect of bright and dark contrast and is any region chosen from the bottom layer, walls or any other space from bottom up to the water surface of the water body intended for culturing crustaceans. Within the above-said chosen region, the bright and dark contrast can be spread, generated or projected on any floating attachable material and/or any fixed attachable material.

The effect of bright and dark contrast is generated by one or many light-emitting sources directly and/or modified with reflection arrangements, of one or more combinations of painted figures and/or one or more sets of protrusions, and/or filtration setups, of one or more filters of various designs.

Such apparatuses, including equipments, devices or other means, for generating the effect of bright and dark contrast can be installed onto the above-said predetermined place directly, the nearby space above water or even the exterior side of the container's sides and bottom layer as long as the effect of bright and dark contrast projected, spread or generated in the predetermined place can be received by the cultured crustaceans.

The above-mentioned equipments, devices or means for generating the effect of bright and dark contrast are the apparatuses that include one or more light-emitting sources of incandescent/fluorescent light bulbs or the LEDs directly, and/or one or more light filters, one or more shadow-producing protrusions and painted figures. If the above-listed apparatuses are not light emitting sources, one or more additional illuminating sources are adopted as an auxiliary device. The aforesaid light filter has structures of two or more light transparencies between and including 0 to 100%. A filter plate used in this invention, which has 0% transparency at its plate body and 100% transparency at its perforations, is an extreme case.

At the predetermined place, spots lighted up with glowing light bulbs and LEDs, by figures with higher light reflections, by protrusions facing light sources, and the illuminating light passing through high-transparency perforations of a light filter are defined as the first brightness sub-areas, and the unlighted spots, with less illumination, with less reflected light and of shadow cast areas are defined as the second brightness sub-areas.

Thus the aforesaid predetermined place can be distinguished into one or more first brightness sub-areas and one or more second brightness sub-areas, wherein the aforesaid first brightness sub-areas are brighter than the aforesaid second brightness sub-areas. The bright and dark contrast is the contrast between the first brightness sub-areas and the connected or nearby second brightness sub-areas.

The present invention offers apparatuses to be used in methods for attracting aquatic crustaceans to move close for hiding or staying and gives the possibility to manage the displacement of aquatic crustaceans in cultured water body. By directing the non-molting crustaceans to move into this predetermined area, the present invention offers practical apparatuses to be used as a step to eliminate their cannibalistic action towards newly molted mates who would retract backward away from this predetermined area. This present invention therefore contributes a risk reduction means for higher-density culture of aquatic animals leading to the acquirement of a higher ratio of benefit/cost in aquaculture industry.

The active reduction of cannibalism of this present invention also eliminates the need of culture-tank's high water depth (60–200 cm) expected to be helpful for cannibalism control. Thus, through making shadow-water culture possible, this present invention gives the feasibility to install shallow-water tanks into a multi-layered culturing system. Moreover, the central idea in the present apparatuses for guiding aquatic crustaceans, based upon the biological propensity responding to bright and dark contrast, is also effective to various kinds of insects besides the aquatic crustaceans mentioned in this invention, and it could be applied to many kinds of fields, such as aquaculture and agriculture including trapping and gathering of cultured animals for feeding and harvesting and managing captivated animals for exhibition, etc.

BRIEF DESCRIPTION OF THE DRAWINGS

In the drawings:

FIG. 1–5 are schematic drawings of apparatuses for generating the visual effect of bright and dark contrasts used in the present invention for guiding aquatic crustaceans by utilizing their biological tendency responding to the visual stimuli.

FIG. 1 is a schematic presentation of a light-reflector installed at the bottom portion of the water body of culture, which is constituted by a grid-like pattern created by dark-colored adhesive tapes or paints applied on the bottom of a culture container.

FIG. 3 is a schematic presentation of a light sifting filter plate providing the specific effect onto a predetermined place at the bottom portion of the water body of culture.

FIGS. 4 and 5 are schematic presentations of networks of wall-like and cone-like protrusions respectively installed at the bottom portion of the water body of culture.

DETAILED DESCRIPTION OF THE PREFERRED EMBODIMENTS

Figure 1:
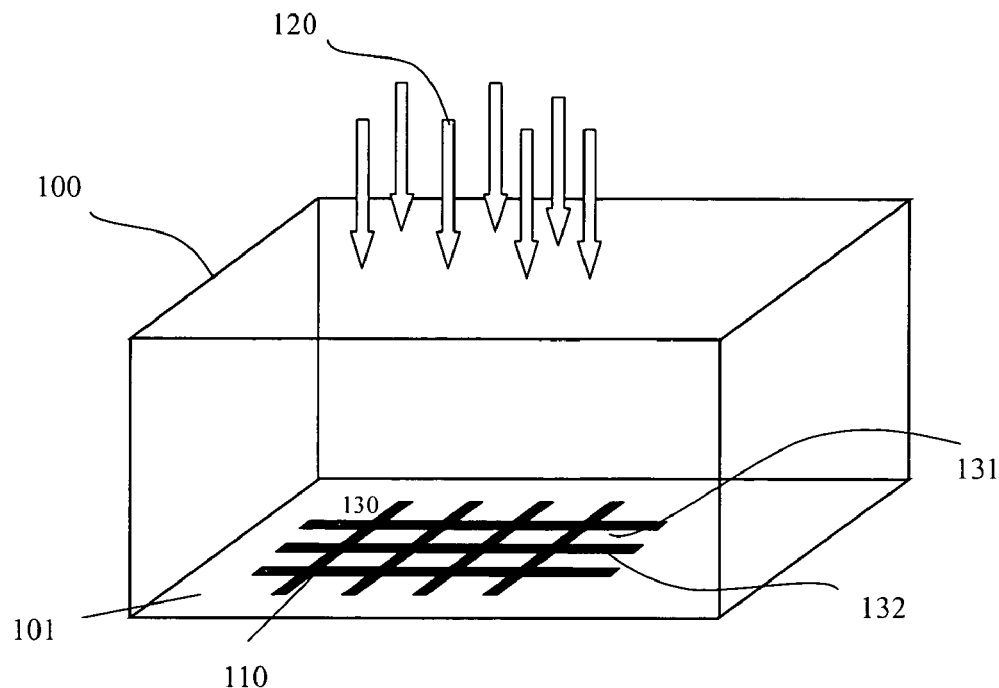

The present invention provides apparatuses to be used in methods for guiding the motion of aquatic crustaceans after these crustaceans are fed full but prior to the status that these crustaceans are hungry again. These methods comprise the step of generating the effect of bright and dark contrast at the predetermined place within the body of water and are described in the co-pending application Ser. No. 10/929,901, filed on Aug. 30, 2004, and entitled "Method for Guiding Aquatic Crustaceans by Utilizing Their Biological Tendency Responding to Bright and Dark Contrast" which is incorporated herein by reference in its entirety.

The method for attracting aquatic crustaceans to move close to a predetermined place for hiding or staying after theses crustaceans are fed full but prior to the status that these crustaceans are hungry again comprises the step of generating the effect of bright and dark contrast at the predetermined place within the water body of culture. The aforesaid predetermined place can therefore be distinguished by its composition of one or more first brightness sub-areas and one or more second brightness sub-areas.

The apparatuses for attracting aquatic crustaceans to move to a predetermined place for hiding or staying offered in the present invention comprises a container for carrying the water body of culture and a predetermined place inside said container expressing an effect of bright and dark contrast.

The predetermined place within the water body of culture is the place, presenting the visual effect, chosen from the bottom surface, the walls, or any space from bottom up to the water surface of the water body of culture. Within the above-said chosen region, the bright and dark contrast can be generated, projected, painted and/or spread, on any floating attachable material and/or any fixed attachable material.

The above-said effect of bright and dark contrast is generated by one or many light-emitting sources directly or, modified by reflection of one or more combinations of painted figures and/or one or more sets of protrusions, and/or by filtration of one or more filters with various filtration effects. Such light-emitting sources, light-reflecting or light filtering apparatuses/materials can be installed onto the above-said predetermined place directly, the nearby space above water or even the exterior side of the container's sides and bottom layer as long as the effect of bright and dark contrast generated, projected, spread and/or painted at the predetermined place can be received by the cultured crustaceans.

The aforesaid predetermined place can therefore be distinguished by its composition of one or more first brightness sub-areas and one or more second brightness sub-areas. The bright and dark contrast is the contrast between an above-said first brightness sub-area and an above-said second brightness sub-area. The aforesaid first brightness sub-areas are brighter than the aforesaid second brightness sub-areas.

The size and depth of a container carrying the water body of culture can vary according to the species and size of aquatic crustaceans reared in practice without specific limitations. For white shrimps, *Litopenaeus vannamei*, they can be cultured in a water body of about 10 cm depth, which is much less than the 60 cm to 200 cm depth in traditional marine culture for shrimp like blue shrimp, *Penaeus setiferus*, white shrimp, *Litopenaeus vannamei*, tiger shrimp, *Penaeus monodon*, and Kuruma shrimp, *Panaeus japonicus*.

The first brightness sub-areas and the second brightness sub-areas can be regularly or irregularly arranged and produced simultaneously or in an unsynchronized fashion. Modifying position or angle of the light reflecting/filtering apparatuses (such as the aforesaid painted figures, protrusions and filters) and/or the coexisting illuminating sources or changing the arrangement of the light emitters is capable of altering the brightness or the shape of each first or second brightness sub-area. Moreover, shapes, arrangements and reflection levels of the figures, the structures and characteristics of the filters are also ready to be adjusted in order to create the desired brightness in both first and second brightness sub-areas. The brightness of each first or second brightness sub-area is constant or changeable. Neither all first brightness sub-areas are necessarily of same brightness nor all second brightness sub-areas are necessarily of same brightness, if number of the first brightness sub-area and/or the second brightness area is larger than one.

Figure 3:
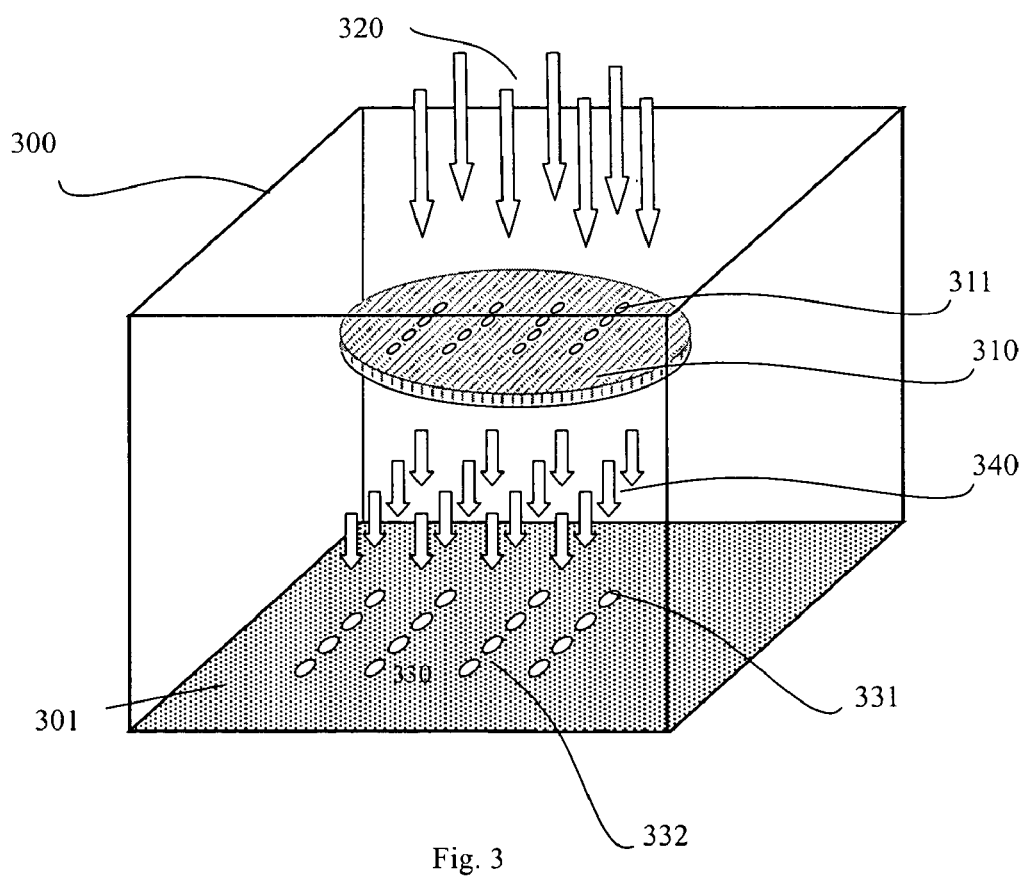
Figure 4:
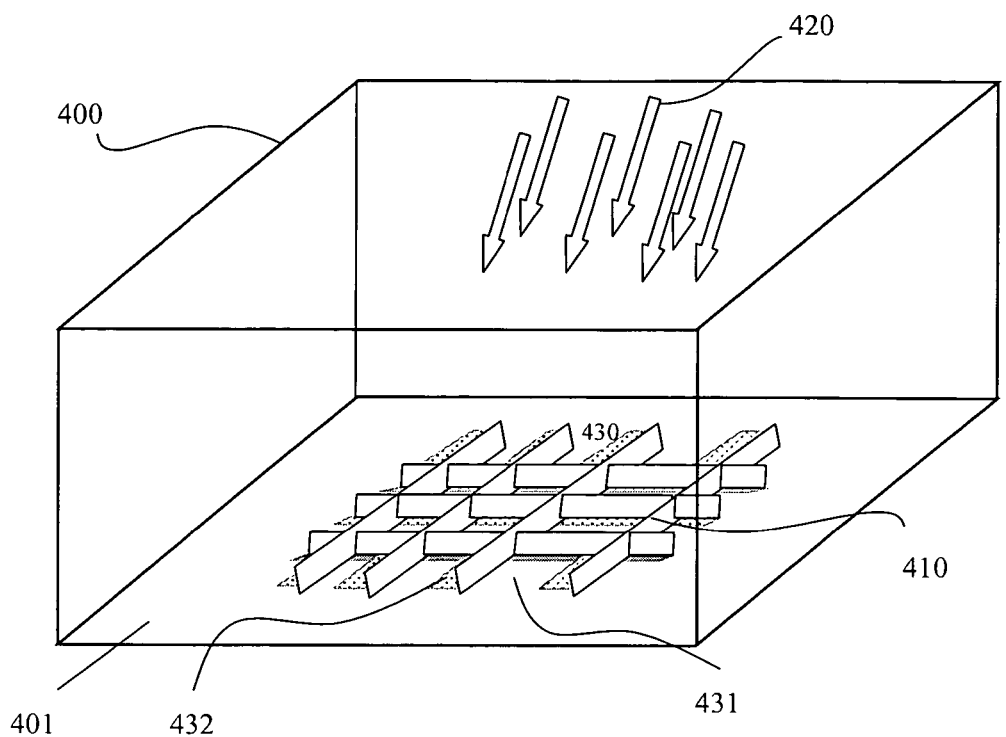
Figure 5:
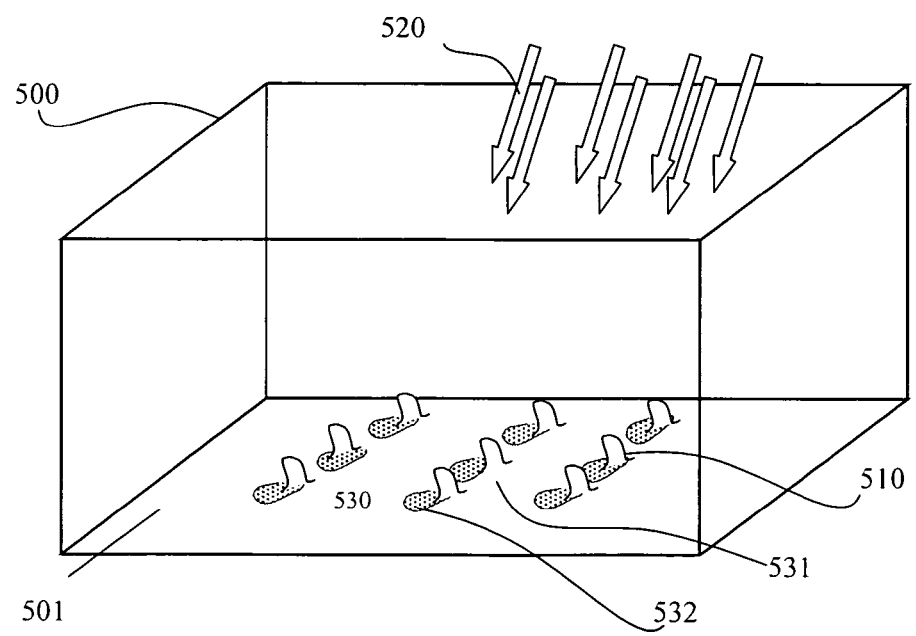

The bright and dark contrast can be produced from a light-emitting source directly (see FIGS. 2*a* and 2*b*), or with a filter plate (see FIG. 3), a light-reflecting painted figure (see FIG. 1) and light reflection networks of protrusions (see FIGS. 4 and 5).

When a light-emitter like LEDs or fluorescent/incandescent light is selected, it could be used as the light emitting source for generating the contrast effect directly and can be closely deployed at a predetermined place. Single or multiple said emitters, with/without same brightness, are both able to be utilized to generate the bright and dark contrast. On/off manipulations of the emitters, the differences between the emitters' brightness and the brightness differences between the surrounding less illuminated places and the places lighted by emitters all can produce aforementioned bright and dark contrast.

Figure 2A:
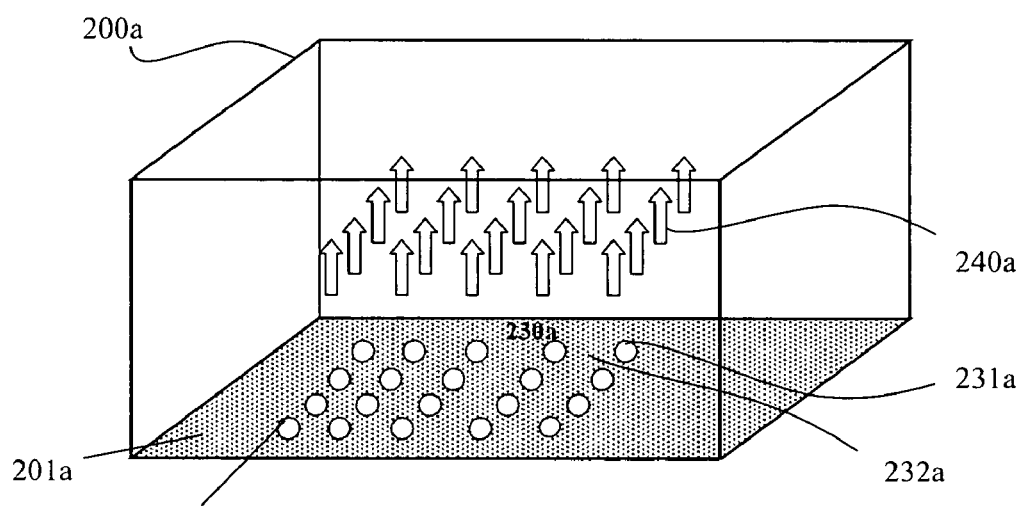
FIG. 2a is a schematic presentation of LED light-emitters installed at the bottom portion of the water body of culture, forming an array-like regular pattern.
Figure 2B:
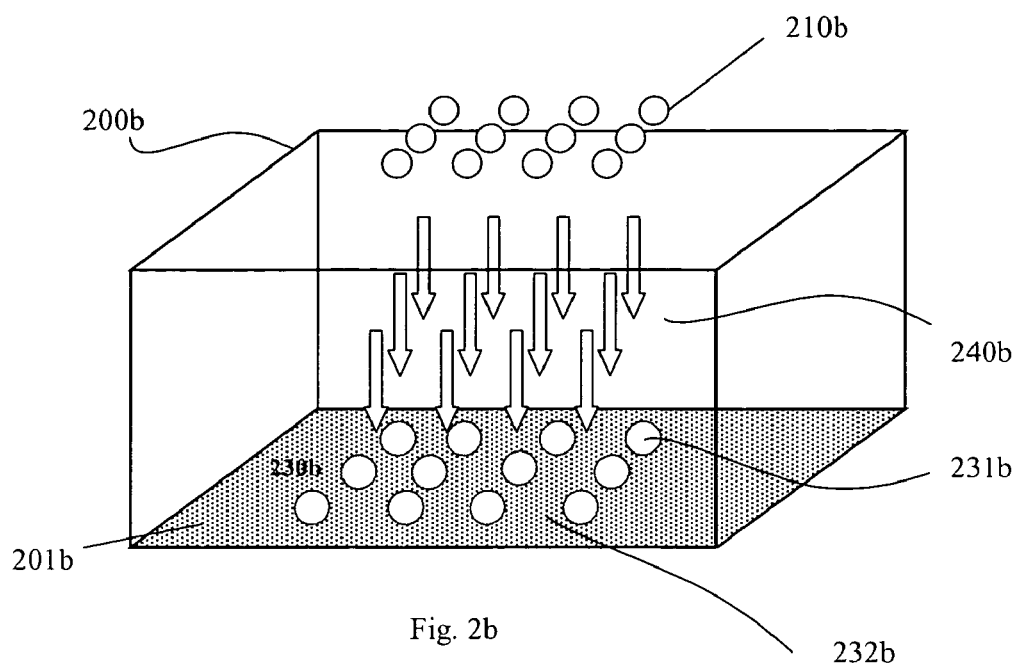
FIG. 2b is a schematic presentation of LED light-emitters installed above the water body of culture, forming an array-like regular pattern.

The preferred embodiment adopts multiple numbers of emitters, like FIGS. 2*a* and 2*b*, with on/off manipulations, producing effective contrast of bright and dark. Considering high burn-out consumption of emitters due to repeatedly turning them on and off, an area deployed with persistently glowing emitters in a loosely arranged pattern with space in between is preferred. This loose pattern of emitters can be made by a plurality of individual emitter or emitter group irregularly dispersed or regularly arranged. On the other hand, on/off manipulations of single or multiple emitters, which is grouped or not, is also sufficient to produce the bright and dark effects, and emitters in such condition, can flash synchronously, alternatively or totally in an unsynchronized fashion. As known in the art, a transparent structure or material (not shown in the figure) may cover over the light emitters to prevent them from immersion in water.

When a light-reflector/filter is chosen, such as the flat area with painted figures of different reflection levels, see FIG. 1, protrusions which form shadows by reflecting a portion of illuminating light, see FIGS. 4 and 5, a filter which has sub-areas with different light transparencies (between and including 100% and 0%) and can thus serves as a sieve that creates an effective image of dark and bright contrast through and onto the bottom of the water body of culture, see also FIG. 3, there should be an auxiliary illuminating source, outside and/or inside the water body of culture.

The first brightness sub-areas and the second brightness sub-areas derived from the light emitting sources directly or with filters, or from the light reflecting sources can be shaped into linear, square, round, hexagon-like or any kind of geometric or non-geometric figures and arranged into rows, circles, grids or regular/irregular styles. The illuminating sources used to shine on filters, painted figures or protrusions are commercially available light bulbs or LEDs; normally, light that generates a light intensity at 1–300 lux at the surface of or within the water body of the culture is used.

Position of the light filter is chosen between bottom of the culture container and the illuminating source in order to form a light pattern mixed with shadow and lighted spots at the bottom or through the water body of culture, see FIG. 3. In one preferred embodiment, this filter can be installed under the water surface of the water body of culture to further providing the cultured crustaceans with a tangible and touchable structure for hiding and staying. Both the brighter areas, defined as the first brightness sub-areas derived from the illuminating light passing through the high-transparency openings in the filter, and the less-bright areas, defined as the second brightness sub-areas derived from the illuminating light blocked by the non-opening, or less-transparent, areas of the filter, jointly result in the formation of the bright and dark contrast.

The painted figures, images created by light filters and/or protrusions can be deployed directly onto the predetermined place. Areas surrounding the predetermined place can be further lighted with even or graded intensities to enhance the attracting effects built into the predetermined place.

The aquatic crustaceans in the present invention include, but not limited to, shrimp and crab; wherein *Litopenaeus vannamei, Penaeus monodon, Penaeus setiferus* and *Panaeus japonicus* are preferable.

In one embodiment, the cultured aquatic crustacean is white shrimp, *Litopenaeus vannamei,* and depth of the water body is of about 10 cm. A filter plate, containing perforations of one size or various sizes at about 0.2 to about 2 cm in diameter, is placed about 4 to about 9 cm deep into the water. A fluorescent illuminating light source, reaching to the water surface evenly with a light intensity at about 10–60 lux, shines to the underwater filter plate. While light reaches to the filter, a part of it goes through high-transparency perforations and the rest of it is blocked by the non-opening portion of the filter, an effect of bright and dark contrast is thus created at the predetermined place. For white shrimp, a bright and dark contrast with about 25 lux at the first brightness sub-areas and about 5 lux at the second brightness sub-areas has been found very effective. That is white shrimp of various weight (each of about 0.05 to 40 g) are observed to approach the predetermined place effectively after feeding. Moreover, the shrimp of large numbers can be seen to hide under this properly arranged light-filter plate as short as about 30 minutes after feeding.

The overall apparatuses for generating the effects of bright and dark contrast are shown in FIG. 1~5 and described in following embodiments.

In embodiment 1, see FIG. 1, strip-like dark colored figures, constructed with dark paint or adhesive tape, are combined into a grid-like pattern 110 deployed onto a predetermined place 130 at the bottom 101 of the container 100. The deep-colored regions 132 and the un-painted region 131 at the predetermined place 130 respectively construct the aforesaid second brightness sub-areas and the aforesaid first brightness sub-areas, jointly these sub-areas constituting the bright and dark contrast under the illuminating source 120. When the container is made of the light-penetrable material at the predetermined place and the colored figures are also made of light-penetrable material, the illuminating source, at this condition, can be arranged under the container shining upwardly to the colored figures which is positioned inside the predetermined place or at the exterior side of the container corresponding to the predetermined place in order to produce an effect of bright and dark contrast. In another embodied example similar to the abovesaid arrangement, a combination of geometrical or non-geometrical patterns with different levels of brightness is installed inside at said predetermined place or on the exterior side at the location corresponding to the predetermined place; the illuminating source then arranged at a position where the illuminating source can shines to the installed combination of geometrical or non-geometrical patterns with different levels of brightness, when the area of said container which is shined by said illuminating source is light-penetrable.

In embodiment 2, see FIG. 2a, light-emitters 210a arranged into an array is the direct origin of the bright and dark contrast. The emitter 210a can be a LED, a fluorescent light bulb, an incandescent light bulb or any of other light sources. A LED is preferred here because it is economical and durable. However, the fluorescent light bulb is also preferred considering its low price and availability. The emitter 210a's array is placed at the bottom 201a of the container 200a. And the predetermined place 230a can thus be distinguished into several less illuminated sub-areas 232a, intended to be the second brightness areas, and several illuminated sub-areas 231a, intended to be the first brightness areas. The emitters glow persistently or alternatively and their brightness is constant or changeable. In this embodiment, a plurality of individual LED glowing persistently is preferred because of its easy installation and management.

In embodiment 3, see FIG. 2b, light-emitters 210b arranged into an array is the origin of the bright and dark contrast. The emitter 210b can be a LED, a fluorescent light bulb, an incandescent light bulb or any of other light sources. A LED is preferred here because it is economical and durable. However, the fluorescent light bulb is also preferred considering its low price and availability. The emitter 210b's array is not placed at the bottom 201b of the container 200b like the case in embodiment 2 but instead placed above surface of the water body of culture loaded into container 200b. With the emitter 210b's array image projecting on, the predetermined place 230b can thus be distinguished into several less illuminated sub-areas 232b, intended to be the second brightness areas, and several illuminated sub-areas 231b, intended to be the first brightness areas. The emitters glow persistently or alternatively and their brightness is constant or changeable. In this embodiment, a plurality of individual LED glowing persistently is preferred because of its easy installation and management.

In another embodied example, similar to the embodiments 2 and 3, when the portion of the container which is shined by the light-emitting source is light-penetrable, the light-emitting source can be arranged at a position outside the container where the light-emitting source can shine over the predetermined place. This position for the installment of the illuminating light is not limited to the space above or below the container.

In embodiment 4, see FIG. 3, a perforated filter plate 310 with substantially 100% light transparency at its perforations 311 and substantially 0% light transparency at the rest of the plate surrounding perforations 311 is adopted to sift the illuminating light 320. Several light columns 340 are formed and therefore the filter plate produces simultaneously several illuminated sub-areas 331, intended to be the first brightness sub-areas, and the under illuminated sub-areas 332, intended to be the second brightness sub-areas. Both sub-areas jointly constitute the effect of bright and dark contrast at and above the predetermined area 330 on bottom 301 of container 300.

The filter plate 310 can be an opaque round plate of PVC-like material constructed as a horizontal light filter, but its shape, material and position angle respectively are not limited to be round, PVC and horizontal. Other shapes, materials and/or position suitable for generating intended effects are usable. For example, the quartz, acrylic, glass or the like could be employed as the material for filter plate 310. Shape of the opening 311 is not limited to be a round hole and size of each opening 311 is of one size or various sizes of about 0.1 to about 8 cm in diameter. The distance of about 0.1 to about 8 cm between neighboring perforations 311 has been tested to be effective. The perforations 311, although they have substantially 100% light transparency in this embodiment, other materials/structures contributing to different light transparency can be adopted. The light transparency of the filter plate itself is also adjustable.

Position of the filter 310 is located between the bottom layer 301 and the illuminating source 320, either above the surface of or immersed in, the water body of culture loaded in container 300. When this light-filtering plate immersed into the water 2–9 cm deep, it has been proved to be effective not only for attracting fed white shrimp but also creating a tactile sensation that enhances *Penaeus setiferus* and *Litopenaeus vannamei*'s hiding behavior at predetermined place 330 where the said bright and dark contrast is present. This kind of arrangement is preferred for the containers made of non-light-penetrable materials. For adopted containers made of light-penetrable materials, the filter is still installed between the predetermined place and the illuminating source, and the illuminating source is not necessarily arranged above the container. For example, an illuminating source can be arranged below the container with a light-penetrable bottom and shines upwardly to a filter which is located above the illuminating source but below the predetermined place; a pattern of bright and dark contrast can be generated at the predetermined place inside the container by such arrangement.

In all embodiments with filters adopted, such as in embodiment 4 or its similarities, the filter's position angles can be further arranged to be adjustable. The filter's angle is defined as the angle between the normal line of the filter surface and the vertical axis of the container.

In embodiment 5, see FIG. 4, a network of thin-wall protrusion 410 is installed on bottom 401 of container 400 at a predetermined place 430. This network of protrusion 410 is formed by interlacing thin-wall plates into a grid-like pattern sitting vertically on the predetermined place 430 at bottom 401 of container 400. The height of the network of protrusion 410 in this embodiment is of 0.1 to 8 cm and the distance between two neighboring parallels of protrusion plates is of 0.1 to 8 cm. A bright and dark light contrast effect can be produced by projecting light source 420 at an angle toward network 410. Range of the aforesaid height of and distance between protrusion plates can be adjusted depending on size and species of the cultured animals and/or angles of the illuminating light. Shadow sub-areas 432 derived from shade of the network of protrusion 410 under illuminating light 420 are intended to be the second brightness sub-areas which constitute the bright and dark contrast when in combination with lighted sub-areas 431, intended to be the first brightness sub-areas. This embodiment has an additional advantage that it also provides habitable shelters facilitating the staying and hiding activities of aquatic crustaceans at predetermined place 430 after they have been attracted to it.

In embodiment 6, see FIG. 5, within container 500, a network of cone like protrusion 510 is constructed at a predetermined place 530 on container bottom 501 as a variation of the present invention. Shape of the protrusion 510 includes, but not limited to, a column-like or a taper shape. The network of protrusion 510 forms lighted sub-areas 531 and casts shadowed sub-areas 532 under angled illuminating light 520. The shadowed sub-areas 532 are intended to be the second brightness areas and the lighted sub-areas 531 are intended to be the first brightness sub-areas. Both, the first and second sub-areas combined, constitute the effect of bright and dark contrast. Height of the protrusion 510 in this embodiment is of about 0.1 to about 8 cm and distance between two neighboring protrusions 510 is about 0.1 to about 8 cm. Range of the aforesaid height and distance can be adjusted depending on size and species of the cultured animals and/or angle of illuminating light 520.

There is another embodied example similar to the embodiments 5 and 6. For it, an illuminating source can be arranged at a position outside the container where the light-emitting source can shine to the predetermined place inside the said container through a corresponding and light-penetrable portion of the said container. In this embodiment, position of the illuminating source is not limited to the space above the container.

The area of the predetermined place depends on species and size of animals reared and the size of culture container in use. It is preferred to have the area of the predetermined place and the rest of the container's bottom proportioned to a ratio like 1:1; in one culture test, such ratio has led to lowered cannibalization incidents. Thus, the area surrounding the predetermined place with brightness of even or gradually grading quality may be further applied into the above-mentioned embodiments to facilitate movement of non-molted crustaceans searching for their hiding place at the predetermined place and leave alone newly molted mates who have backward retraction ability to move and stay in areas surrounding but away from the predetermined place.

With the present apparatuses and the methods in the aforementioned co-pending application, construction of a tank having at least one predetermined area expressing the effect of bright-dark contrast can culture aquatic crustaceans at an increased density and at a reduced depth of the culture container to almost 10 cm still with cannibalization under control. A multi-layered culture system construction is therefore feasible due to reduction of water body in each culture layer. For culturing aquatic crustaceans and other animals, being able to have multi-layered culture greatly increases the space utilization efficiency of each square meter of a production area. The results generated in one embodied multi-layered system while culturing *Litopenaeus vannamei* are shown in Table 1.

The culture density of each square meter production floor is calculated as the total weight of shrimp cultured in 10-layered culture system, with 10 individual culture layers stacking one above the other, divided by the square area covered by the culture system which is equal to the bottom area of each individual culture layer. This table depicts that by using this 10-layered culture system with technology of the present invention in place, a very high production efficiency at a density of 10 kg or more *Litopenaeus vannamei* per square meter production floor can be attained with reduced cannibalism (expressed as nearly 100% survival rates). This is a significant improvement over the density of 0.73 kg marine shrimp produced over per square meter pond area (calculated by the data published in the annual report of Taiwan, R.O.C. Council of Agricultural Affairs on fishery in 1987, which is the most successful year of marine shrimp culture in Taiwan and the yield was 80,000 tons for 11,000 hectares of land used).

TABLE 1

| Date | Density* ($kg/m^2$) | Weight per shrimp (gram) | Weekly growth (%) | Survival rate (%) | Total number of shrimp in sampled layer |
|---|---|---|---|---|---|
| 1. Growth progression data of white shrimp (*Litopenaeus vannamei*) juveniles in one test group | | | | | |
| Feb. 12, 2001 | 3.89 | 0.86 | | | 448 |
| Feb. 19, 001 | 4.7 | 1.05 | 22 | 99.11 | 444 |
| Feb. 26, 2001 | 6.72 | 1.52 | 45 | 98.87 | 439 |
| Mar. 05, 2001 | 9.18 | 2.09 | 39 | 99.09 | 435 |
| Mar. 12, 2001 | 10.42 | 2.43 | 16 | 97.47 | 424 |

TABLE 1-continued

| Date | Density* (kg/m²) | Weight per shrimp (gram) | Weekly growth (%) | Survival rate (%) | Total number of shrimp in sampled layer |
|---|---|---|---|---|---|
| 2. Progression data of juvenile white shrimp growing into young shrimp in one test group | | | | | |
| Mar. 26, 2001 | 9 | 2.8 | | | 318 |
| Apr. 02, 2001 | 11.26 | 3.52 | 25 | 99.69 | 317 |
| Apr. 09, 2001 | 13.59 | 4.27 | 21 | 99.37 | 315 |
| 3. Growth progression data of young white shrimp in one test group | | | | | |
| Mar. 19, 2001 | 10.72 | 4.41 | | | 251 |
| Mar. 26, 2001 | 12.48 | 5.04 | 14 | 97.61 | 245 |
| Apr. 02, 2001 | 13.18 | 5.44 | 8 | 97.96 | 240 |
| 4. Summary data of growing large white shrimp in two test groups | | | | | |
| April 2001 (11 days) | 22.2 | 17.0–17.9 | 3.3 | 100 | 47 |
| April 2000 (12 days) | 19.3 | 16.1–17.4 | 5.0 | 100 | 42 |

The inventive subject matter being thus described, it will be obvious that the same may vary in many ways. Such variations are not to be regarded as a departure from the spirit and scope of the inventive subject matter, and all such modifications are intended to be included within the scope of the following claims.

What is claimed is:

1. An apparatus for attracting aquatic crustaceans, which comprises:
    a container for carrying a water body of culture; and
    a means for generating an effect of bright and dark contrast adapted to said container;
    wherein said means for generating an effect of bright and dark contrast includes:
        a combination of geometrical or non-geometrical patterns with different levels of brightness which is arranged at said predetermined place; and an illuminating source which is arranged above said combination of geometrical or non-geometrical patterns with different levels of brightness; and
    said effect of bright and dark contrast is expressed at a predetermined place inside said container and said predetermined place is selected from the group consisting of
        (1) a region on the inner side of said container's bottom portion;
        (2) a region on the inner side of said container's wall below the water surface of said water body of culture;
        (3) a region at or under the water surface of said water body of culture on a floating attachable material; and
        (4) a region at or under the water surface of said water body of culture on a fixed attachable material; and
    whereby said predetermined place can be distinguished into a first brightness sub-area and a second brightness sub-area and said first brightness sub-area is brighter than said second brightness sub-area.

2. The apparatus of claim 1, wherein said means for generating an effect of bright and dark contrast comprises:
    a light-emitting source which is installed at or above said predetermined place.

3. The apparatus of claim 2, wherein said light-emitting source comprises an LED.

4. The apparatus of claim 2, wherein said light-emitting source comprises a fluorescent light bulb.

5. The apparatus of claim 2, wherein said light-emitting source comprises an incandescent light bulb.

6. The apparatus of claim 1, wherein said means for generating an effect of bright and dark contrast comprises:
    a light-emitting source arranged at a position outside said container where said light-emitting source can shine to said predetermined place, wherein the portion of said container which is shined on by said light-emitting source is light-penetrable.

7. The apparatus of claim 6, wherein said light-emitting source comprises an LED.

8. The apparatus of claim 6, wherein said light-emitting source comprises a fluorescent light bulb.

9. The apparatus of claim 6, wherein said light-emitting source comprises an incandescent light bulb.

10. The apparatus of claim 1, wherein said means for generating an effect of bright and dark contrast includes:
    a plurality of protrusions capable of producing shadows of said protrusions which is placed at said predetermined place; and
    an illuminating source which is located above said plurality of protrusions.

11. The apparatus of claim 1, wherein said means for generating an effect of bright and dark contrast includes:
    a plurality of protrusions capable of producing shadows of said protrusions which is placed at said predetermined place; and
    an illuminating source arranged at a position outside said container where said light-emitting source can shine to said predetermined place, wherein the portion of said container which is shined on by said light-emitting source is light-penetrable.

12. An apparatus for attracting aquatic crustaceans, which comprises:
    a container for carrying a water body of culture; and
    a means for generating an effect of bright and dark contrast adapted to said container;
    wherein said means for generating an effect of bright and dark contrast includes:
        a combination of geometrical or non-geometrical patterns with different levels of brightness which is arranged inside at said predetermined place or on the exterior side at the location corresponding to the predetermined place; and an illuminating source arranged at a position where said illuminating source can shine to said combination of geometrical or non-geometrical patterns with different levels of brightness; and
        wherein the area of said container which is shined on by said illuminating source is light-penetrable; and
    said effect of bright and dark contrast is expressed at a predetermined place inside said container and said predetermined place is selected from the group consisting of
        (1) a region on the inner side of said container's bottom portion;
        (2) a region on the inner side of said container's wall below the water surface of said water body of culture;
        (3) a region at or under the water surface of said water body of culture on a floating attachable material; and
        (4) a region at or under the water surface of said water body of culture on a fixed attachable material; and whereby said predetermined place can be distinguished into a first brightness sub-area and a second brightness sub-area and said first brightness sub-area is brighter than said second brightness sub-area.

13. An apparatus for attracting aquatic crustaceans, which comprises:
   a container for carrying a water body of culture; and
   a means for generating an effect of bright and dark contrast adapted to said container;
   wherein said means for generating an effect of bright and dark contrast includes:
      a combination of geometrical or non-geometrical patterns with different levels of brightness which is arranged inside at said predetermined place or on the exterior side at the location corresponding to the predetermined place; and
      an illuminating source which is arranged below said combination of geometrical or non-geometrical patterns with different levels of brightness, wherein the portion of said container which is shined on by said illuminating source is light-penetrable and the material of said combination of geometrical or non-geometrical patterns is light-penetrable; and
   said effect of bright and dark contrast is expressed at a predetermined place inside said container and said predetermined place is selected from the group consisting of
      (1) a region on the inner side of said container's bottom portion;
      (2) a region on the inner side of said container's wall below the water surface of said water body of culture;
      (3) a region at or under the water surface of said water body of culture on a floating attachable material; and
      (4) a region at or under the water surface of said water body of culture on a fixed attachable material; and
   whereby said predetermined place can be distinguished into a first brightness sub-area and a second brightness sub-area and said first brightness sub-area is brighter than said second brightness sub-area.

14. An apparatus for attracting aquatic crustaceans, which comprises:
   a container for carrying a water body of culture; and
   a means for generating an effect of bright and dark contrast adapted to said container;
   wherein said means for generating an effect of bright and dark contrast includes:
      an illuminating source located above said container; and
      a filter located in between said illuminating source and said predetermined place; and
   said effect of bright and dark contrast is expressed at a predetermined place inside said container and said predetermined place is selected from the group consisting of
      (1) a region on the inner side of said container's bottom portion;
      (2) a region on the inner side of said container's wall below the water surface of said water body of culture;
      (3) a region at or under the water surface of said water body of culture on a floating attachable material; and
      (4) a region at or under the water surface of said water body of culture on a fixed attachable material; and
   whereby said predetermined place can be distinguished into a first brightness sub-area and a second brightness sub-area and said first brightness sub-area is brighter than said second brightness sub-area.

15. The apparatus of claim 14, wherein the angle of said filter is adjustable.

16. An apparatus for attracting aquatic crustaceans, which comprises:
   a container for carrying a water body of culture; and
   a means for generating an effect of bright and dark contrast adapted to said container;
   wherein said means for generating an effect of bright and dark contrast includes:
      an illuminating source arranged at a position outside said container where said light-emitting source can shine to said predetermined place, wherein the portion of said container which is shined on by said light-emitting source is light-penetrable; and
      a filter located in between said illuminating source and said predetermined place; and
   said effect of bright and dark contrast is expressed at a predetermined place inside said container and said predetermined place is selected from the group consisting of
      (1) a region on the inner side of said container's bottom portion;
      (2) a region on the inner side of said container's wall below the water surface of said water body of culture;
      (3) a region at or under the water surface of said water body of culture on a floating attachable material; and
      (4) a region at or under the water surface of said water body of culture on a fixed attachable material; and
   whereby said predetermined place can be distinguished into a first brightness sub-area and a second brightness sub-area and said first brightness sub-area is brighter than said second brightness sub-area.

17. The apparatus of claim 16, wherein the angle of said filter is adjustable.

* * * * *